US006871248B2

(12) United States Patent
Riley (10) Patent No.: US 6,871,248 B2
(45) Date of Patent: Mar. 22, 2005

(54) ISOCHRONOUS TRANSACTIONS FOR INTERCONNECT BUSSES OF A COMPUTER SYSTEM

(75) Inventor: Dwight D. Riley, Houston, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 548 days.

(21) Appl. No.: 09/967,606

(22) Filed: Sep. 29, 2001

(65) Prior Publication Data

US 2003/0065845 A1 Apr. 3, 2003

(51) Int. Cl.⁷ .................... G06F 13/42; G06F 15/16; H04J 3/16; H04J 3/22
(52) U.S. Cl. .................. 710/106; 710/105; 370/468; 709/227; 709/228
(58) Field of Search .................. 370/257, 468; 710/105, 106, 107, 113, 305, 306, 309, 241; 709/244, 227, 228

(56) References Cited

U.S. PATENT DOCUMENTS

| | | | |
|---|---|---|---|
| 5,544,324 A | | 8/1996 | Edem et al. |
| 5,778,218 A | | 7/1998 | Gulick |
| 5,857,086 A | * | 1/1999 | Horan et al. ................. 710/306 |
| 5,987,555 A | * | 11/1999 | Alzien et al. ................. 710/312 |
| 5,991,520 A | * | 11/1999 | Smyers et al. ............... 710/100 |
| 6,201,789 B1 | | 3/2001 | Witkowski et al. |
| 6,205,500 B1 | | 3/2001 | Sabotta et al. |
| 6,252,886 B1 | * | 6/2001 | Schwager et al. ........... 370/443 |
| 6,539,081 B2 | * | 3/2003 | Zakrzewski et al. ...... 379/93.32 |
| 6,539,450 B1 | * | 3/2003 | James et al. ................. 710/306 |
| 6,559,675 B2 | * | 5/2003 | Koo ............................. 326/81 |
| 6,631,415 B1 | * | 10/2003 | James et al. ................. 709/227 |
| 6,669,633 B2 | * | 12/2003 | Brodsky et al. ............. 600/437 |
| 6,728,821 B1 | * | 4/2004 | James et al. ................. 710/306 |
| 2002/0018477 A1 | * | 2/2002 | Katz ............................ 370/401 |
| 2002/0083245 A1 | * | 6/2002 | Van De Meulenhof et al. ............. 710/107 |
| 2003/0202539 A1 | * | 10/2003 | Fukunaga et al. .......... 370/489 |

OTHER PUBLICATIONS

PCI–X Addendum to the PCI Local Bus Specification. Revision 1.0. Sep. 22, 1999. pp. 1–2, 13–14, and 199.*
"A Scheme for the Management of Isochronous and Asynchronous Bandwidth in Ring Networks" by Ahmed E. Kamal. Copyright 1994 IEEE. pp. 1398–1407.*
*Standards Project P1394 IEEE Draft Standard for a High Performance Serial Bus*, IEEE Standards Committee, 2 cover pages, pp. i–ii, 207–212 and 236–242 (Jul. 7, 1995).
*Universal Serial Bus Specification Revision 1.0*, Compaq, Digital Equipment Corporation, IBM PC Company, Intel, Microsoft, NEC, Northern Telecom, cover page and pp. 2, 54–56 and 67–83 (Jan. 15, 1996).

* cited by examiner

*Primary Examiner*—Mark H. Rinehart
*Assistant Examiner*—Thomas J. Cleary (57) ABSTRACT

An isochronous channel is configured on an interconnect bus between a first device and a second device. A first device requests an isochronous channel, required bandwidth, and a required service window size. If a service window of the required size at the required bandwidth is available, an isochronous bus controller sends the request to the second device. If the second device has a service window of the required size at the required, it accepts the isochronous channel request. The isochronous bus controller can be a collection of isochronous controllers, each controlling a subset of the interconnect bus. The isochronous bus controller then allocates bandwidth to the first device, notifying the first device to begin generating isochronous transactions, controlling access to the bus to ensure the first device does not exceed the bandwidth allocation. Further, the isochronous bus controller terminates the isochronous channel, if the first device stops sending isochronous transactions.

69 Claims, 7 Drawing Sheets

ISOCHRONOUS TRANSACTIONS FOR INTERCONNECT BUSSES OF A COMPUTER SYSTEM

CROSS-REFERENCE TO RELATED APPLICATIONS

This application is related to commonly owned U.S. patents and patent applications, which are hereby incorporated in their entirety by reference for all purposes:

U.S. Pat. No. 6,266,731, entitled "HIGH SPEED PERIPHERAL INTERCONNECT APPARATUS, METHOD AND SYSTEM," by Dwight Riley and Christopher J. Pettey; and U.S. patent application Ser. No. 09/967,607, entitled "Distributed Peer-To-Peer Communication For Interconnect Busses of a Computer System," by Dwight D. Riley.

STATEMENTS REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Field of the Invention

The present invention is related to interconnect busses of computer systems and in particular to isochronous transactions across such interconnect busses.

2. Description of the Related Art

Many computer systems utilize an interconnect bus for multiple types of traffic. One type of traffic is isochronous traffic. Isochronous traffic is time dependent traffic that requires a certain bandwidth. In addition, isochronous traffic can require a certain minimum payload size per transaction. One example of isochronous traffic is a video signal, which needs to ensure that data is delivered at least as fast as it needs to be displayed, to avoid jerkiness and other similar display problems. Another example of isochronous traffic is an audio signal that is synchronized with a video signal. Conventional interconnect bus architectures have not been optimal for isochronous traffic.

A number of techniques have been employed to provide isochronous traffic on a shared bus. However, these techniques have focused on the interconnect traffic without considering either the requester or the completer of such traffic. Further, these techniques have typically depended on the good behavior of the requester, and typically fail to prevent ill-behaved requesters from using more than the allocated bandwidth.

BRIEF SUMMARY OF THE INVENTION

A disclosed technique provides for isochronous communication on an interconnect bus between a first device and a second device coupled to the interconnect bus. The first device requests an isochronous channel by a sending a transaction to an isochronous bus controller coupled to the interconnect bus. The isochronous bus controller determines whether sufficient bandwidth is available on the interconnect bus. If insufficient bandwidth is available, the first device is notified of the failure of the request. If sufficient bandwidth is available, the isochronous bus controller sends a transaction to the second device requesting an isochronous channel between the first device and the second device.

If the second device determines that it has sufficient bandwidth for the requested isochronous channel, the second device sends an acceptance to the isochronous bus controller. The isochronous bus controller then allocates a portion of the bandwidth of the interconnect bus to the isochronous channel and instructs the first device to begin sending isochronous transactions to the second device.

In one embodiment, the request for an isochronous channel includes a required bandwidth and a required service window size, which can be provided as a minimum and maximum size. In other embodiments, the isochronous bus controller and the second device can adjust the minimum and maximum service window sizes. The isochronous bus controller allocates the required bandwidth to the isochronous channel. If the required bandwidth is greater than the available bandwidth of the bus or the bandwidth of the second device, the request for an isochronous channel fails.

In another embodiment, the isochronous bus controller uses special cycle messages to inform the first device of the beginning and end of a window for isochronous transactions. The isochronous bus controller can repeat sending the special cycle messages until a predetermined condition is reached. In a further embodiment, the predetermined condition can be either the first device initiating non-isochronous transactions.

In one embodiment, the interconnect bus is divided into a collection of bus segments, with bridges connecting the bus segments. The request for an isochronous channel is forwarded through each bridge on a path from the first device to the second device. The isochronous bus controller can also be a collection of distributed isochronous bus controllers, some of which can be bridges. The request is forwarded between each distributed isochronous bus controller on the path. Each bridge and isochronous bus controller can adjust the minimum and maximum service window size based on available service window sizes for the required bandwidth.

In one embodiment, the interconnect bus can be a PCI-X bus, and the request for an isochronous channel can be a command issued on the C/BE# portion of the PCI-X bus.

In one embodiment, the request is routed across the interconnect hierarchy, targeting each bus segment bus controller. On the destination bus segment where the completer is located, the final bus controller converts the message to target the completer device using the data provided in the bus controller messages.

In one embodiment, the isochronous transactions between the first device and the second device are identified as isochronous transactions by an attribute value transmitted during an attribute phase of the transaction.

BRIEF DESCRIPTION OF THE SEVERAL VIEWS OF THE DRAWINGS

A better understanding of the present invention can be obtained when the following detailed description of the preferred embodiment is considered in conjunction with the following drawings, in which.

DETAILED DESCRIPTION OF THE INVENTION

The present invention provides a technique for enhancing the operation of computer system busses that use the extensions to the peripheral component interconnect specification (hereinafter PCI-X busses), as well as logic circuits and signal protocols thereof. For illustrative purposes, embodiments are described herein for computer systems using Intel Corporation microprocessor architectures, and certain terms and references are specific to such processor platforms. PCI-X and the enhancements described herein, however, are hardware independent, and may be used with any host computer designed for this interconnect standard. As will be appreciated by those skilled in the art of computer systems, the disclosed embodiments can be adapted and applied to any computer platform utilizing the PCI-X standard. Further, although the following is described in terms of PCI-X busses, other bus architectures and protocols could also be used, such as the 3GIO bus architecture and protocol promoted by Intel Corporation, Microsoft Corporation, IBM Corporation, Compaq Computer Corporation, and Dell Computer Corporation Referring to FIG. 1, an exemplary schematic block diagram illustrates a computer system according to a disclosed embodiment. The computer system is generally indicated by the numeral 100 and comprises central processing unit(s) (CPU) 102, core logic 104, system random access memory (RAM) 106, a video graphics controller 110, a local frame buffer 108, a video display 112, a PCI/SCSI bus adapter 114, a PCI/EISA/ISA bridge 116, a PCI/IDE controller 118, and, optionally, a network interface card (NIC) 122. Single or multilevel cache memory (not illustrated) may also be included in the computer system 100 according to the current art of microprocessor computer systems. The CPU 102 may be a plurality of CPUs 102 in a symmetric or asymmetric multi-processor configuration.

Figure 1:
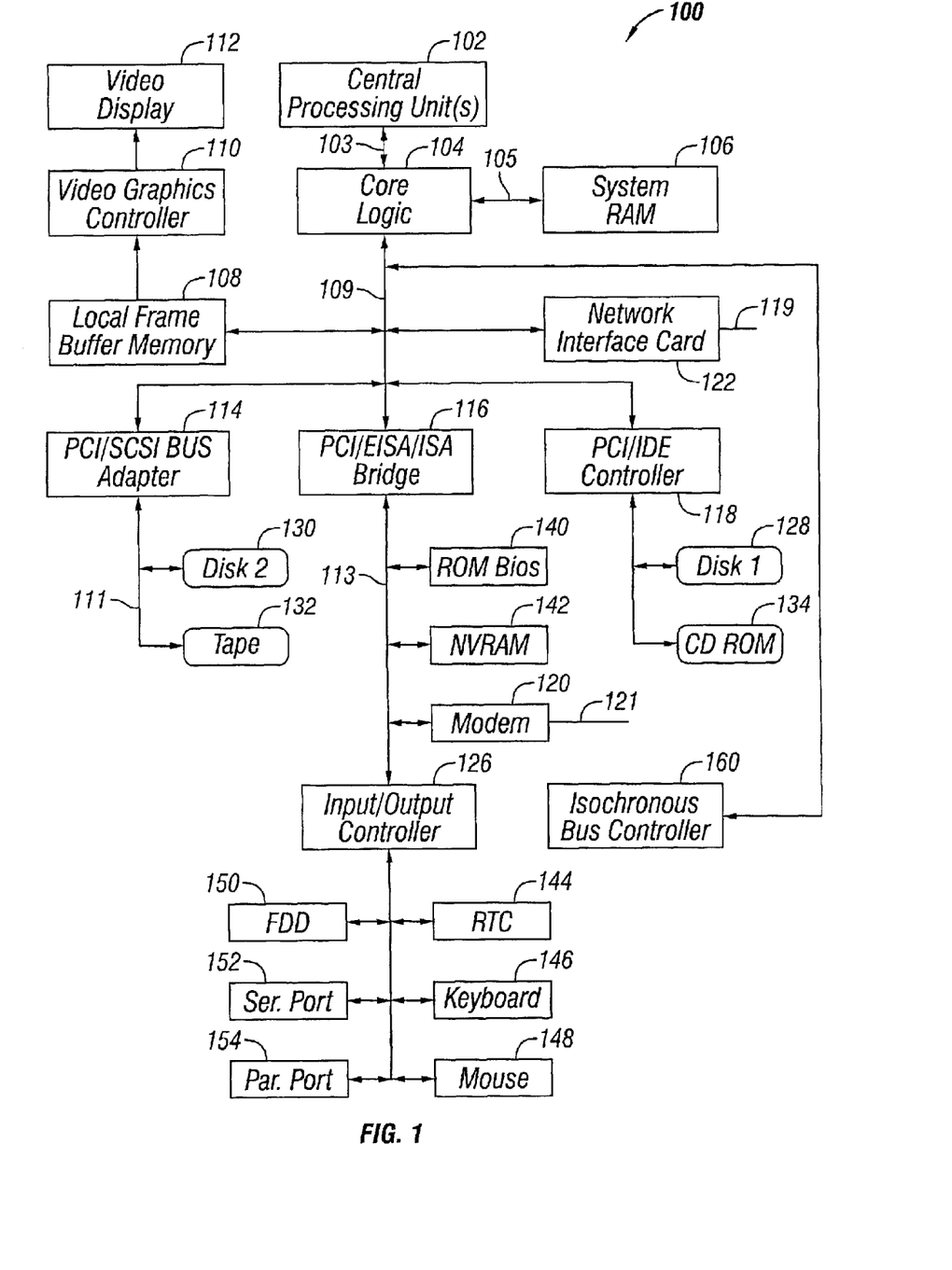
FIG. 1 is a schematic block diagram of a computer system in accordance with a disclosed embodiment.
Figure 2:
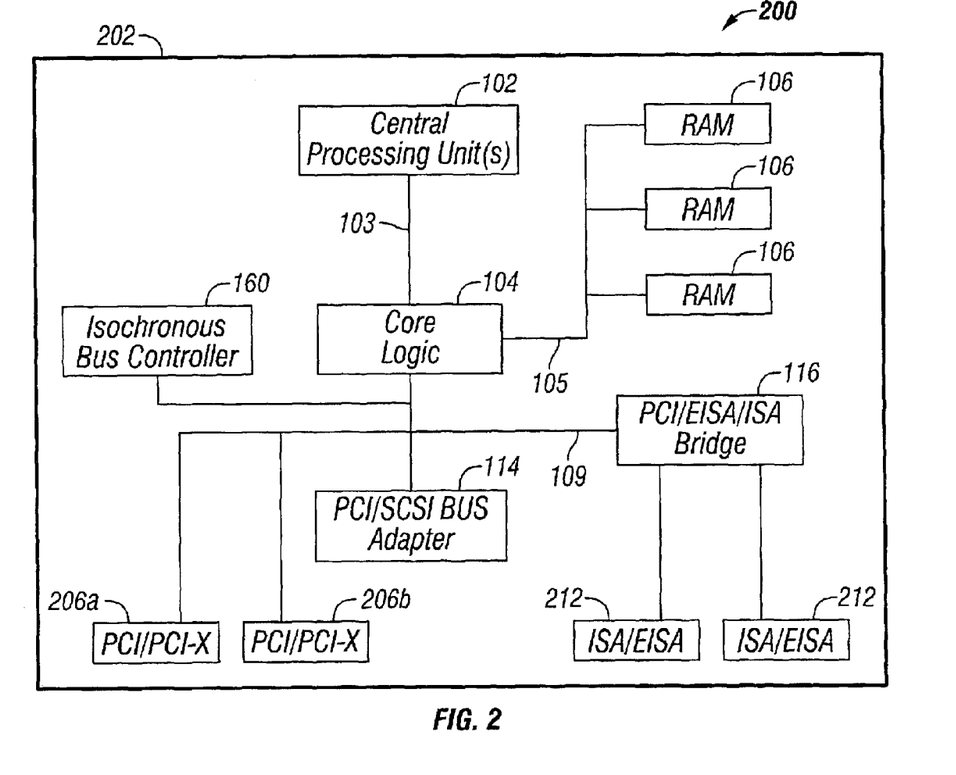
FIG. 2 is a schematic diagram of a printed circuit motherboard of the computer system of FIG. 1.

The CPU 102 is connected to the core logic 104 through a CPU host bus 103. The system RAM 106 is connected to the core logic 104 through a memory bus 105. The core logic 104 includes a host-to-PCI bridge between the host bus 103, the memory bus 105 and a PCI-X bus 109. More than one PCI-X bus is contemplated herein as well as PCI-X-to-PCI-X bridges (not illustrated), and is within the scope and intent of the present invention. The local frame buffer 108 is connected between the video graphics controller 110 and the PCI-X bus 109. The PCI/SCSI bus adapter 114, PCI/EISA/ISA bridge 116, PCI/IDE controller 118 and the NIC 122 are connected to the PCI-X bus 109. Some of the PCI-X devices such as the video controller 110 and NIC 122 may plug into PCI connectors on the computer system 100 motherboard (FIG. 2).

Hard disk 130 and tape drive 132 are connected to the PCI/SCSI bus adapter 114 through a SCSI bus 111. The MC 122 may be connected to a local area network 119. The PCI/EISA/ISA bridge 116 connects over an ESIA/ISA bus 113 to a ROM BIOS 140, non-volatile random access memory (NVRAM) 142, modem 120, and input-output controller 126. The modem 120 connects to a telephone line 121. The input-output controller 126 interfaces with a keyboard 146, real time clock (RTC) 144, mouse 148, floppy disk drive (FDD) 150, serial port 152, and parallel port 154. The EISA/ISA bus 113 is a slower information bus than the PCI-X bus 109 with lower interfaces costs. Further, the disk 128 and CD ROM 134 are connected to the PCI/IDE controller 118.

When the computer system 100 is first turned on, start-up information stored in the ROM BIOS 140 is used to begin operation thereof. Basic setup (BIOS) instructions are stored in the ROM BIOS 140 so that the computer system 100 can load more complex operating system (OS) software from a memory storage device, such as the disk 130. Before the operating system software can be loaded, however, certain hardware in the computer system 100 is configured to properly transfer information from the disk 130 to the CPU 102. In the computer system 100 illustrated in FIG. 1, the PCI/SCSI bus adapter 114 is configured to respond to commands from the CPU 102 over the PCI-X bus 109 and transfer information from the disk 130 to the CPU 102 via busses 109 and 103. The PCI/SCSI bus adapter 114 is a PCI-X device and remains platform independent. Therefore, separate hardware independent commands are used to setup and control any PCI-X device in the computer system 100. These hardware independent commands, however, are located in PCI-X BIOS contained in the computer system ROM BIOS 140. The PCI-X BIOS is firmware that is hardware specific but meets the general PCI Local Bus Specification, Revision 2.2 (the PCI specification) together with the general PCI-X Addendum to the PCI Local Bus Specification 1.0 (the PCI-X specification), both of which are incorporated by reference herein in their entirety. Plug and play and PCI devices (both PCI and PCI-X) in the computer system are detected and configured when a system configuration program is executed. The results of the plug and play and PCI-X device configurations are stored in the NVRAM 142 for later use by the startup programs in the ROM BIOS 140 and the PCI-X BIOS that configure the necessary computer system 100 devices during startup. Also during startup a "built-in-self-test" (BIST) may do diagnostic testing of components, such as PCI-X devices, in the computer system.

An isochronous bus controller 160 is connected to the PCI-X bus 109, for managing isochronous channels on the PCI-X bus 109. Although shown as a separate circuitry 160, the isochronous bus controller 160 can be combined in a single chip or chip set with the core logic 104. Further, although the PCI-X bus 109 of FIG. 1 is a single PCI-X bus segment, the PCI-X bus 109 can be divided into a hierarchy of bridged PCI-X bus segments as described below and the isochronous bus controller can also be divided into distributed isochronous bus controllers, each controlling a portion of the hierarchy of PCI-X bus segments. Some of the distributed isochronous bus controllers can be combined with PCI-X to PCI-X bus bridges of the PCI-X bus hierarchy.

Referring to FIG. 2, a schematic diagram of an exemplary computer system motherboard according to FIG. 1 is illustrated. The computer system motherboard 200 comprises printed circuit board 202, on which components and connectors are mounted thereto. The printed circuit board 202 comprises conductive printed wiring used to interconnect the components and connectors thereon. The conductive printed wiring (illustrated as busses 103, 105 and 109) may be arranged into signal busses having controlled impedance characteristics. Illustrated on the printed circuit board are the core logic 104, CPU(s) 102, RAM 106, embedded PCI/ISA/EISA bridge 116, ISA/EISA connectors 212, embedded PCI/SCSI bus adapter 114, and PCI/PCI-X connectors 206a, 206b (connectors are the same for PCI and PCI-X). The motherboard 200 may be assembled into a case with a power supply, disk drives, etc., (not illustrated) which comprise the computer system 100 of FIG. 1. In one embodiment, the isochronous bus controller 160 can be an adapter plugged into one of the PCI/PCI-X connectors 206.

Figure 3:
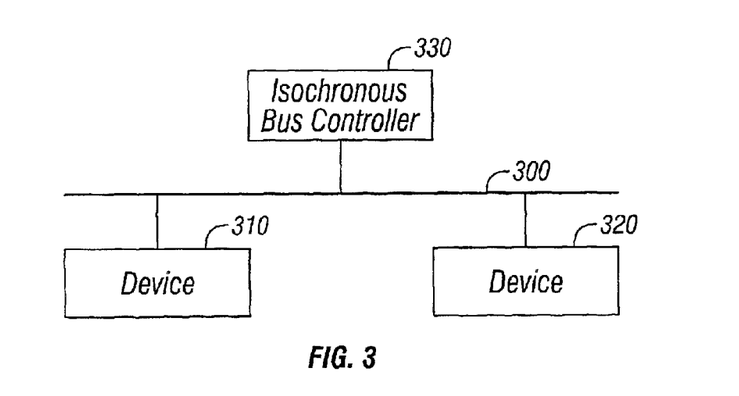
FIG. 3 is a block diagram of an exemplary bus segment in accordance with a disclosed embodiment.

As noted above, isochronous communications are important for streaming video, audio, and other similar data streams that need a particular quality of service. Turning to FIG. 3, an exemplary PCI-X bus segment 300 is shown. Coupled to PCI-X bus segment 300 are two PCI-X devices 310 and 320. Devices 310 and 320 can be any PCI-X devices capable of isochronous communications. For example, device 310 can be a video display adapter, while device 320 can be a video playback device. Other devices can be attached to the bus segment 300, but are omitted for clarity. A PCI-X isochronous bus controller 330 is also coupled to the PCI-X bus segment 300. The isochronous bus controller 330 can be the core logic 104, as shown in FIG. 1, or a separate isochronous bus controller logic as described above isochronous channel is established between two endpoint devices 310 and 320 by the isochronous bus controller 330, with a maximum bandwidth for the isochronous channel guaranteed by the isochronous bus controller 330. Although time division multiplexing also guarantees a certain bandwidth, this technique for establishing and using isochronous channels differs in that fixed time slots are not allocated to the endpoint, and the bandwidth used by the channel can vary up to the guaranteed maximum. Thus, isochronous channels can provide more efficient use of available bandwidth when the data flow between the endpoints can be at a variable rate, because unused bandwidth can be made available for other devices on the bus.

In addition, devices needing isochronous communications can require a minimum and maximum service window to enable the devices to process the data. For example, a device may be able to process data in an isochronous channel at up to 10 MB/second, but only if the data is transmitted in service windows of 1 MB to 2 MB, and not if the data is transmitted in service windows of 1 byte or 10 MB because of internal processing overhead or other constraints such as buffer sizes.

Because isochronous channels are defined by bandwidth and a service window. Establishing an isochronous channel in a disclosed embodiment specifies a required bandwidth and a required service window. The isochronous channel can then be established allocating the required bandwidth with a service window between the minimum service window and the maximum service window values. If insufficient bandwidth is available to allocate the isochronous channel or if no service window of the required size is available at that bandwidth, the request to establish an isochronous channel fails.

Once an isochronous channel is established, the endpoints of the channel can communicate during each service window for the duration of the channel in the expectation of being able to transmit data at a guaranteed rate, regardless of other traffic on the bus. Once the requester no longer needs the isochronous channel, the channel is "torn down" and channel and completer resources are freed.

Figure 4:
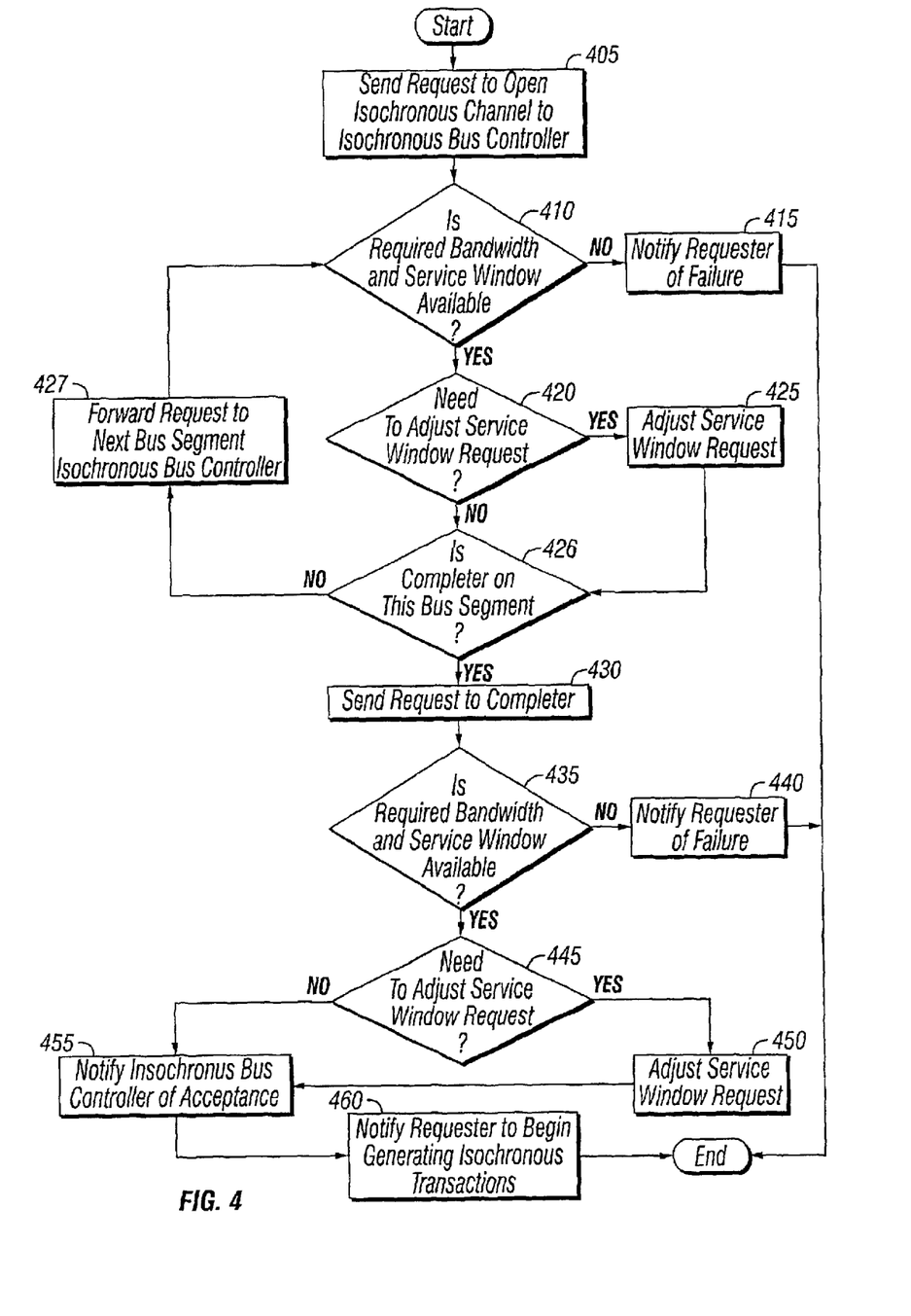
FIG. 4 is a flowchart illustrating establishing an isochronous channel according to a disclosed embodiment.

Turning to FIG. 4, a flowchart illustrates establishing an isochronous channel according to a disclosed embodiment.

In step 405, a requester device, corresponding to device 310 in FIG. 3, requests establishment of the isochronous channel with a completer device 320 from the isochronous bus controller 330. In one embodiment, the request specifies a required bandwidth and a required service window sizes which can be specified as a minimum and maximum service window size.

Figure 8:
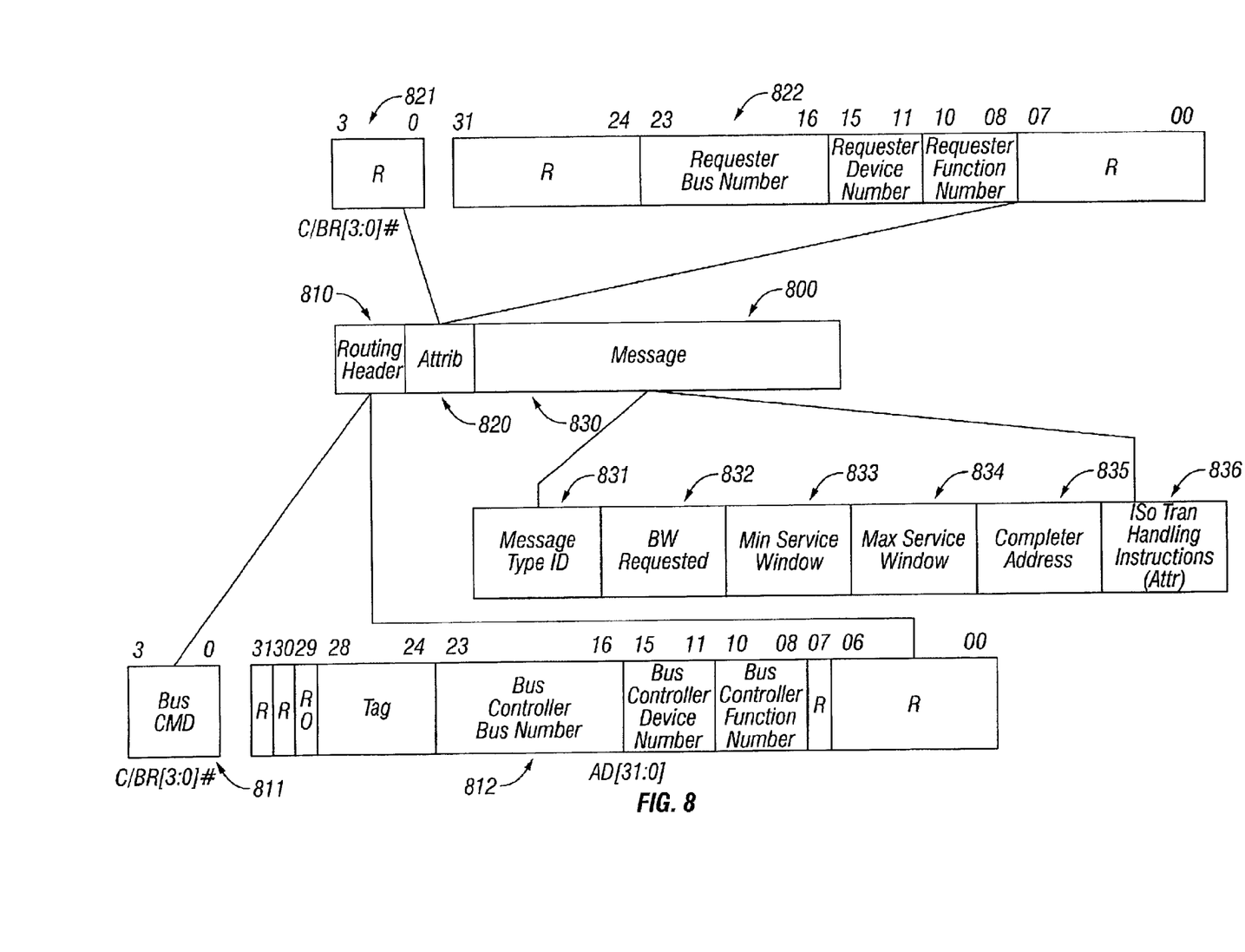
FIG. 8 is a block diagram of a PCI-X transaction according to one embodiment.

In one embodiment, the transaction can be a PCI-X transaction constructed as shown in FIG. 8. A routing header 810 is specified in the PCI-X address phase, using a format similar to the PCI-X Split Completion transaction. A bus command 811 is specified on the C/BE[3:0]# lines. In one embodiment, the bus command operates like the PCI-X Split Completion bus command. A isochronous bus controller address 812 is specified on the AD lines.

As shown in FIG. 8, the isochronous bus controller bus number, device number, and function number are specified in AD[23:16], AD[15-11], and AD[10-8], respectively. This address information allows the transaction to be routed by any necessary PCI-X bridges intermediate between the requester 310 and the isochronous bus controller 330. In one embodiment, multiple bridges and distributed isochronous bus controller, each controlling one or more interconnect bus segments, must be traversed on a path between the requestor 310 and the completer 320 as described below. In that embodiment, the routing header bus number is changed as the transaction traverses the path. When the transaction reaches the completer 320, the device number and function number are changed to identify the completer 320 device number and function number.

In an attribute phase of the transaction 800, the requestor 310 specifies the requester attributes of the first device 310 in the conventional PCI-X fashion, as shown in fields 821 on the C/BE[3:0]# lines and the AD[31:0] lines of field 822, including the requester addresses expressed as bus number (AD[23:16]), device number (AD[15:11]), and function number (AD[10:8]). In one embodiment, the attribute phase can identify the transaction 800 as a message type transaction. In the data phase of the transaction 800 a message field 830 contains the request constraints. A message type field 831 indicates this transaction 800 is an isochronous channel request. Field 832 specifies the required bandwidth. In one embodiment, the field 832 is specified in terms of MB/second. Other units can be used. Fields 833 and 834 specify a minimum service window and a maximum service window. A service window is a period during which isochronous transactions can be generated for the isochronous channel. For example, an isochronous channel with a bandwidth of 20 MB/s can have a service window of ¹⁄₁₀ of a second. The isochronous bus controller 330 and any bridges between the requester 310 and completer 320 can increase the minimum service window 833 and reduce the maximum service window as necessary, based on available service windows along the path. A completer address field 835 specifies the completer 320's bus number, device number, and function number similar to the attribute field 820's requester address. Additional isochronous transaction attributes, such as a "no snooping" attribute are specified in field 836. Other arrangements and fields could be used as desired.

The isochronous bus controller 330 then accepts the transaction by asserting the PCI-X DEVSEL# signal according to the PCI-X protocol. In one embodiment, a device driver of an operating system associated with the isochronous bus controller 330 processes the request. In another embodiment, firmware or hardware of the isochronous bus controller 330 processes the request.

In step 410, the isochronous bus controller 330 determines whether sufficient bandwidth is available for the requested isochronous channel, comparing the available bandwidth of the PCI-X bus to the required bandwidth and the determining if the required service window is available. If the available bandwidth is less than the required bandwidth, the isochronous bus controller 330 will complete the isochronous channel request in step 415, indicating failure of the request. If no service window of the required sized is available, the isochronous bus controller will fail to request.

In step 420, the isochronous bus controller determines whether the required service window sizes must be adjusted. If the available service window sizes are greater than the minimum service window size or less than the maximum service window size, the service window requirement can be adjusted by the isochronous bus controller 330 in step 425. If the completer 320 is on a different bus segment than the requester 310, then the request will be forwarded to all isochronous bus controllers 330 that service a path between the requester 310 and the completer 320, as shown in steps 426–427, repeating steps 410–427 for each isochronous bus controller servicing the path.

The transaction is then forwarded to the completer 320 in step 430. In one embodiment, the isochronous bus controller (s) 330 that service the path between the requester 310 and the completer 320 can tentatively reserve bandwidth for the isochronous channel, pending acceptance by the completer 320.

The completer 320 accepts the transaction by asserting DEVSEL# according to the PCI-X Specification, then compares the required bandwidth and service window values to the bandwidth and service window capability of the completer 320 in steps 435–450 similarly to the processing by each isochronous bus controller 330 in steps 410–425.

If the bandwidth and service window requirements of the request can be met by the completer 320, each isochronous bus controller 330 is notified of the acceptance of the request in step 455. The isochronous bus controller 330 then establishes the requested isochronous channel, allocating the requested bandwidth and service window. If the requester 310 and the completer 320 are on different bus segments, the acceptance will be forwarded back through the isochronous bus controller(s) 330 that service the path between completer 320 and requester 310.

In step 460, the isochronous bus controller 330 then notifies the requester 310 device that the isochronous channel has been established and notifies the requester 310 to begin sending isochronous transaction requests to the completer 320. In one embodiment, the isochronous bus controller 330 notifies the requester 310 by using a PCI-X special cycle command. At this point the isochronous channel has been established.

The isochronous bus controller 330 manages the isochronous channel. In one embodiment, the isochronous bus controller 330 can use a timer to determine the length of the service window during which the requester 310 can submit isochronous transactions.

Figure 5:
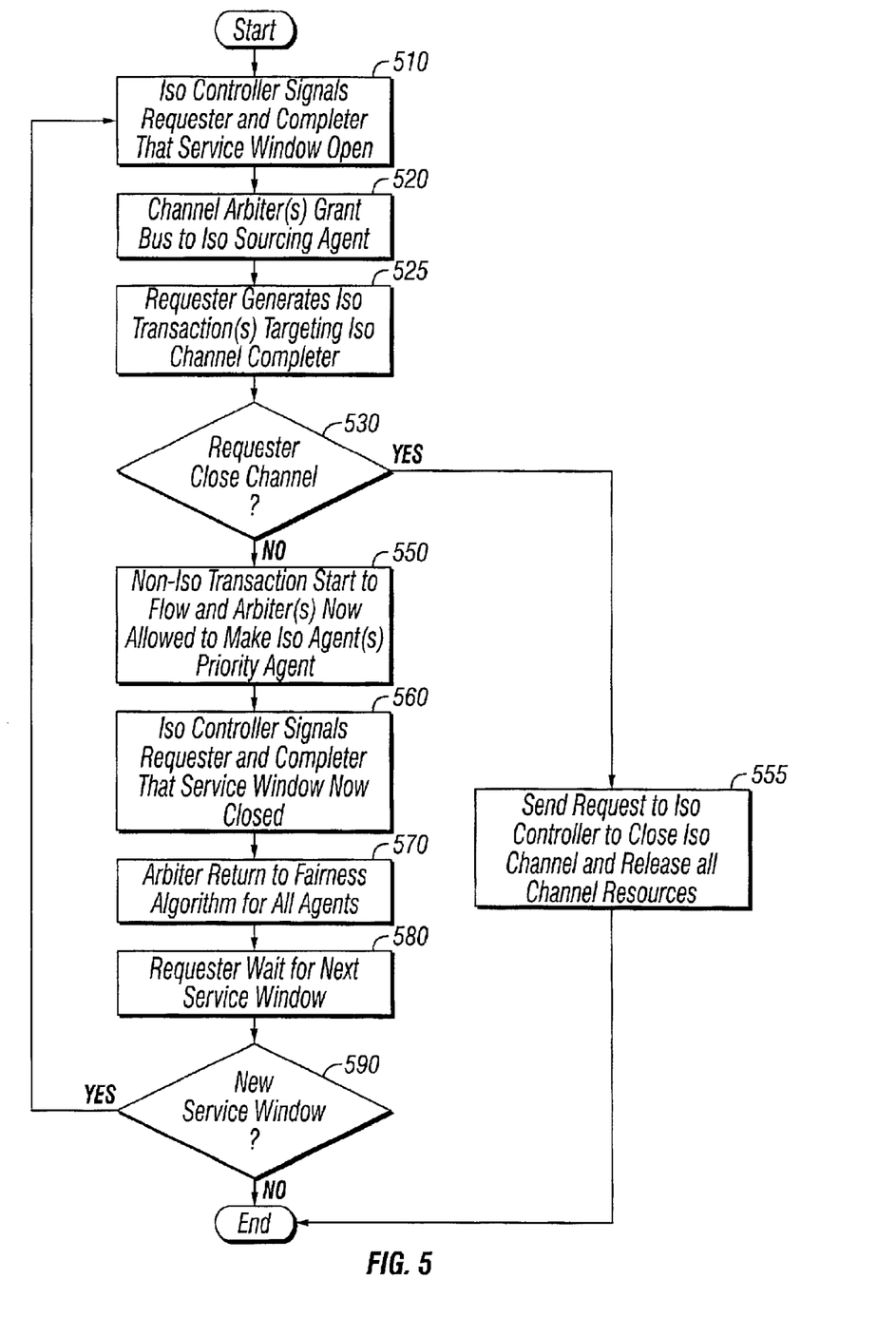
FIG. 5 is a flowchart illustrating sending isochronous transactions using an isochronous channel according to a disclosed embodiment.

Turning to FIG. 5, the isochronous bus controller 330 notifies the requester 310 and the completer 320 in step 510 that a service window has opened, using a special cycle transaction as in step 460 of FIG. 4. A bus arbiter, such as a PCI-to-PCI bridge, which can be separate from the isochronous bus controller or combined with the isochronous bus controller, controls access to each bus segment on the path between the requester 310 and the completer 320. As the bus arbiter receives the first isochronous transaction from its sourcing agent, the bus arbiter grants the bus segment to the sourcing agent in step 520, typically using a conventional PCI fairness algorithm. The bus arbiter further recognizes that an isochronous window is being opened and parks the bus segment on its sourcing agent.

The requester 310 then generates isochronous transactions to the completer device 320 in step 525, marking each transaction as isochronous, as described below.

In one embodiment, if the requester 310 is finished with the isochronous channel before the end of the service window as determined in step 530, the requester 310 can notify the isochronous bus controller to close the isochronous channel in step 555. The isochronous controller 330 can then close the isochronous channel, which indicates to the bus arbiters to release resources dedicated to the isochronous channel, and return to the conventional PCI fairness algorithm for granting access to the bus segment controlled by the bus arbiter.

Non isochronous transactions can then begin to flow on the traversed bus segments in step 550. In one embodiment, the bus arbiters along the isochronous channel path make their isochronous channel sourcing agents priority agents using conventional PCI techniques, to allow quick response to the next isochronous transaction in a service window.

At the end of the isochronous service window period, the isochronous bus controller 330 notifies the requester 310 and the completer 320 in step 560 that the service window is closed. In one embodiment, the isochronous bus controller 330 uses another PCI-X special cycle transaction to notify the requester 310 and the completer 320 of the end of the service window. Other notification techniques can be used.

In step 570, the bus arbiters along the path between requester 310 and completer 320 can now resume using conventional PCI arbitration techniques for their bus segments, such as conventional fairness algorithms.

The requester 310 then waits for a next service window to open in step 580. While waiting for the next service window, the requester 310 can perform other actions as required. In one embodiment, the isochronous bus controller 330 can use a timer to determine when to initiate opening the next service window.

Once the service window has been closed in step 560, if a new service window is to be opened, as determined in step 590, steps 510 through 580 can be repeated multiple times, with the isochronous bus controller opening and closing service windows for the isochronous channel.

The isochronous bus controller 330 monitors the transactions on the bus requested by the requester 310. At any time that the isochronous bus controller 330 determines that the requester 310 is misbehaving, the isochronous bus controller 330 can notify the requester 310 and the completer 320 that the service window and/or the isochronous channel are closed. Bus arbiters along the path can then release resources dedicated to the isochronous channel.

The above description ignores errors and error handling that may cause premature closure of service windows and the isochronous channel. One skilled in the art will understand such error handling techniques.

The disclosed technique allows the isochronous bus controller 330 to enforce the bandwidth allocation of the isochronous channel, by instructing the requester 310 when to begin and when to end sending isochronous transaction requests to the completer 320. In conventional isochronous techniques, the bandwidth allocation is typically not enforceable, and depends on the "good behavior" of the endpoint devices.

Each isochronous transaction requested by the requester 310 during the service window period is identified as an isochronous transaction. In one embodiment, the attribute phase of the PCI-X protocol is used to identify the transaction as an isochronous transaction. In another embodiment, isochronous transactions can use the format of peer-to-peer transactions as defined by the related application entitled "Distributed Peer-To-Peer Communication For Interconnect Busses of a Computer System," Attorney Docket No. H0526127.1126US0, previously incorporated by reference. In a further embodiment, isochronous transactions can include an additional attribute in an attribute phase of the transaction indicating that all data errors should be ignored. This attribute can be used for video streams, for example, in which a momentary error in the picture can simply be ignored or not detectable by the viewer.

If the requester 310 sends non-isochronous transactions during the isochronous window, the isochronous bus controller 330 can notify the requester 310 that the service window and isochronous channel are closed. In addition, if the requester 310 initiates isochronous transactions with other than the previously indicated requester 310, the isochronous bus controller 330 can close the service window and isochronous channels. In one embodiment, the isochronous bus controller 330 would not close the isochronous channel unless the requester 310 repeatedly abused the service window. In one embodiment, the isochronous bus controller 330 uses a PCI-X special cycle to close the service window and isochronous channels, notifying the requester 310 of the closure of the termination of the service window and isochronous channel.

In addition to identifying the transactions as isochronous, the requester 310 can set the conventional PCI-X relaxed ordering attribute during the attribute phase of isochronous transactions, to allow the isochronous transactions to bypass other transactions that would otherwise block them according to the conventional PCI-X ordering rule. In one embodiment, PCI-X bridges and devices use a reserved isochronous buffer queue to ensure the quality of service for isochronous transactions.

Figure 6:
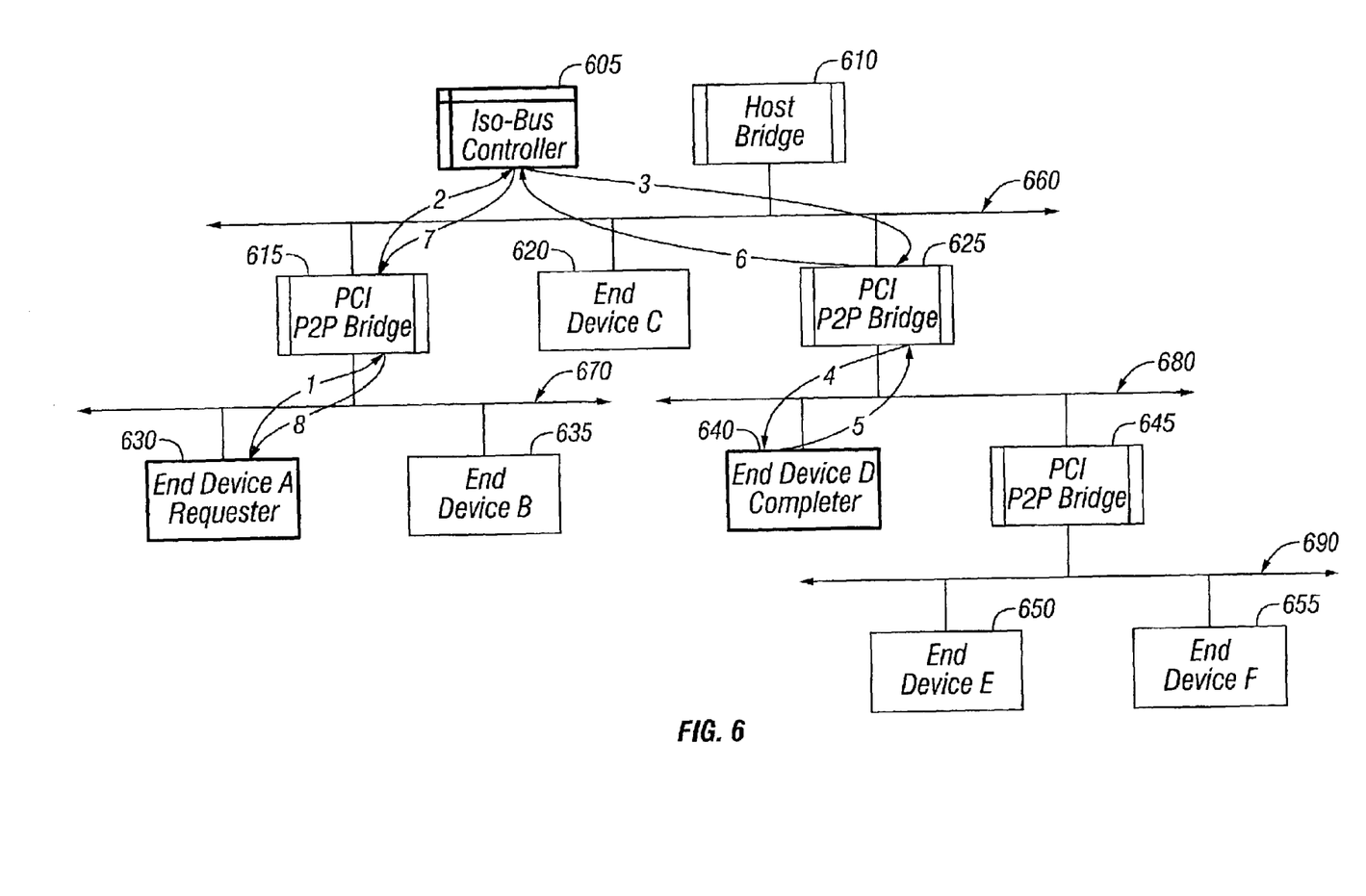
FIG. 6 is a block diagram illustrating an embodiment with a central isochronous bus controller according to one embodiment.
Figure 7:
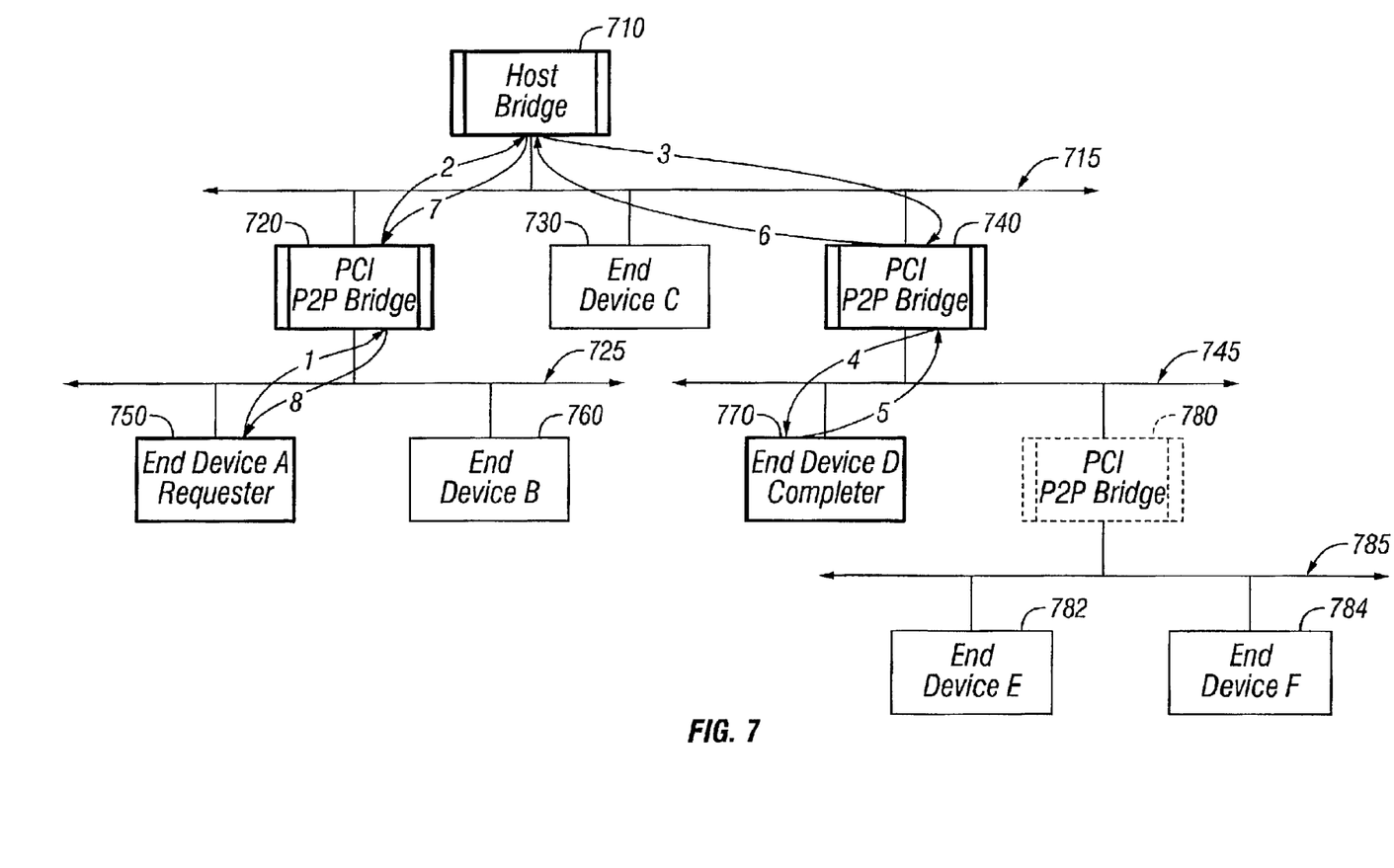
FIG. 7 is a block diagram illustrating an embodiment with a distributed isochronous bus controller according to one embodiment.

As shown in FIG. 3, the isochronous bus controller 330, the requester 310, and the completer 320 are all on the same interconnect bus segment. As shown in FIGS. 6–7, and as described above with regard to FIGS. 4–5, other embodiments are contemplated.

FIG. 6 illustrates an embodiment in which a central isochronous bus controller 605 controls an interconnect hierarchy of three bus segments 660, 670, and 680.

A requester 630 makes an isochronous channels request to the isochronous bus controller 605, which is routed by the PCI-to-PCI bridge 615 based on the routing header corresponding to field 810 of FIG. 8, as shown by lines 1 and 2. The isochronous bus controller 605 then processes the request as explained above, then passes the request to the completer 640. The path to the completer 640 traverses bus 660, bridge 625, and bus 680 as shown by lines 3–4. However, bridge 645, not on the path between requester 630 and completer 640, does not process the transaction. Further, the end device C 620 on the bus 660, the end device B 635 on the bus 670, the end device E 650 on the bus 690, and end device F 655 on the bus 690 do not process the transaction. On accepting or failing the request, the oath is traversed in reverse, as shown in lines 5–8.

Turning now to FIG. 7, a distributed isochronous bus controller embodiment is shown. In this embodiment, the host bridge 710, and the PCI-to-PCI bridges 720, 740, and 780 are isochronous bus controllers for bus segments 715, 725, 745, and 785 respectively. As in FIG. 6, a request from requester 750 traverses a path from requester 750 to completer 770 as shown by lines 1–4. Likewise the acceptance or rejection by the completer 770 traverses lines 5–8 back to the requester 750. As in FIG. 6, isochronous bus controller 780, end device E 782, end device F 784, end device C 730, and end device B 760 are uninvolved, because the device are not on the path.

Unlike FIG. 6, however, the isochronous bus controller function is divided among bridges 710, 720, and 740. Thus each bridge 720, 710 and 740 processes and forwards the request for an isochronous channel, individually determining whether the required bandwidth is available on their respective bus segments 725, 715, and 745, as well as potentially adjusting the service window size.

In FIG. 7, the service window size can vary on the different bus segments, being adjusted at each step on the path between requester 750 and completer 770. However, the entire path guarantees a quality of service level corresponding to the required bandwidth and with service windows within the minimum and maximum service windows of the original request for an isochronous channel.

In FIG. 6, isochronous bus controller 605 monitors the isochronous channels from end to end, and opens and closes the service windows as explained above. In FIG. 7, each with the distributed isochronous controllers 720, 710, and 740 monitor separate portions of the channels, and open and close service windows on the bus segments 725, 715, and 745, respectively, controlled by the distributed isochronous bus controllers 720, 710, and 740. In both embodiments, bridges along the isochronous channel path have separate buffers for isochronous traffic, to ensure isochronous transactions can proceed without being blocked by non-isochronous traffic. In addition, the isochronous bus controller, whether centralized as in FIG. 6 or distributed as in FIG. 7, ensures that service windows of different isochronous channels never overlap.

The foregoing disclosure and description of the preferred embodiment are illustrative and explanatory thereof, and various changes in the components, circuit elements, circuit configurations, and signal connections, as well as in the details of the illustrated circuitry and construction and method of operation may be made without departing from the spirit and scope of the invention.

I claim:

1. A method of providing isochronous channels in a computer system, comprising the steps of:

(a) sending a request on an interconnect bus of the computer system to establish an isochronous channel with a second device from a first device, wherein sending the request comprises:
        specifying a required bandwidth value; and
        specifying a required service window size;
    (b) determining whether sufficient bandwidth on the interconnect bus is available for the isochronous channel requested in step (a), wherein determining comprises:
        determining an available bandwidth of the interconnect bus;
        comparing the available bandwidth to the required bandwidth value; and
        if the available bandwidth is lower than the required bandwidth value, notifying the first device of the failure of the request;
    (c) if step (b) determines sufficient bandwidth is available, sending the request on the interconnect bus to the second device, wherein step (c) comprises:

determining whether a service window of the required service window size is available for the required bandwidth;

if no service window is available for the required bandwidth of the required service window size notifying the first device of the failure of the request; and adjusting the required service window size based on available service window sizes;

(d) determining whether the second device has sufficient bandwidth for the isochronous channel requested by the first device in step (a);

(e) if step (d) determines that the second device has sufficient bandwidth for the isochronous channel requested by the first device, sending an acceptance of the request;

(f) allocating a portion of the bandwidth of the interconnect bus for the isochronous channel; and (g) instructing the first device to begin generating isochronous transactions with the second device.

2. The method of claim 1, the required service window size comprising:
a minimum service window size; and
a maximum service window size.

3. The method of claim 1, step (d) comprising the steps of:
notifying the second device of the request;
determining an available second device bandwidth;
comparing the available second device bandwidth to the required bandwidth;
if the available second device bandwidth is less than the required bandwidth value, notifying the first device of the failure of the request.

4. The method of claim 1, step (f) comprising the step of:
allocating an isochronous channel on the interconnect bus of the required bandwidth value and required service window size.

5. The method of claim 1, step (g) comprising the steps of:
notifying the first device to begin initiating isochronous transactions in the isochronous channel; and
notifying the first device to stop initiating isochronous transactions.

6. The method of claim 1, further comprising the steps of:
monitoring isochronous transactions in the isochronous channel;
repeating step (g) until the monitoring step determines a predetermined condition has occurred.

7. The method of claim 6, wherein the predetermined condition is the first device ceasing to initiate isochronous transactions.

8. The method of claim 1, further comprising the steps of:
providing an isochronous bus controller, the isochronous bus controller performing step (b), (c), and (f).

9. The method of claim 1, wherein the interconnect bus is a modified PCI-X bus.

10. A method of requesting isochronous communication between a first device and a second device, comprising the steps of:
sending a first request transaction on an interconnect bus from the first device to an isochronous bus controller, the first request transaction comprising:
a request to be allocated bandwidth for an isochronous channel;
an identification data for the second device;
a required bandwidth;
a minimum service window size; and
a maximum service window size;

sending a second request transaction on the interconnect bus from the isochronous bus controller to the second device, the second request transaction comprising:
a request to begin an isochronous channel;
an identification data for the first device;
a required bandwidth;
a minimum service window size; and
a maximum service window size;

sending a first response transaction on the interconnect bus from the second device to the isochronous bus controller, the first response transaction comprising:
an indicator of acceptance or rejection of the request; and
a minimum service window size; and
a maximum service window size; and sending a second response transaction on the interconnect bus from the isochronous bus controller to the first device, the second response transaction comprising:
notification to begin sending isochronous transactions to the second device, wherein the notification comprises a command signal indicating an isochronous window beginning.

11. The method of claim 10, the request to be allocated bandwidth comprising:
a command signal.

12. The method of claim 11,
wherein the interconnect bus is a modified PCI-X bus, and
wherein the command signal is a signal on a C/BE# portion of the modified PCI-X bus.

13. The method of claim 11, the request to be allocated bandwidth further comprising:
an indicator that the transaction is a message type command.

14. The method of claim 13, the request to be allocated bandwidth further comprising:
a message type indicator, indicating that the transaction is a request to open an isochronous channel.

15. The method of claim 11,
the request to be allocated bandwidth further comprising:
an address phase, the address phase comprising:
a isochronous bus controller bus identifier; and
an isochronous bus controller device identifier,
further comprising the step of:
routing the first request transaction across the interconnect bus by using the isochronous bus controller bus identifier and the isochronous bus controller device identifier.

16. The method of claim 10, wherein the second request transaction is generated by forwarding the first request transaction.

17. The method of claim 10, wherein the interconnect bus is a modified PCI-X bus, and wherein the command signal is a special cycle command signal on a C/BE# portion of the modified PCI-X bus.

18. A computer system comprising:
a central processing unit connected to a host bus;
a random access memory connected to a system memory bus;
an interconnect bus operating according to an interconnect protocol, the interconnect bus comprising:
a plurality of bus segments;
a plurality of bus bridges, each of the bus bridges coupling a pair of the plurality of bus segments, each of the bus bridges comprising:
a bus arbiter controlling access to a bus segment of the plurality of bus segments, the bus arbiter adapted to allocate bandwidth of the bus segment for an isochronous channel at the direction of the bus controller;

a core logic chip coupled as a first interface bridge between the host bus and the system memory bus, as a second interface bridge between the host bus and the interconnect bus, and as a third interface bridge between the system memory bus and the interconnect bus;

a first device coupled to the interconnect bus, the first device operating according to the interconnect protocol, the first device adapted to provide a plurality of phases in a first interconnect transaction, the first device adapted to issue a first command in a first phase according to the interconnect protocol and a data corresponding to the first command in a subsequent phase, the first command requesting an isochronous channel with a second device identified in the data, the data comprising:

a second device identification;
a required bandwidth; and
a required service window size; and an isochronous bus controller, the isochronous bus controller adapted to allocate and manage bandwidth of the interconnect bus for isochronous channels, wherein the first interconnect transaction is sent to the isochronous bus controller, wherein the isochronous bus controller forwards the first interconnect transaction to the second device if the required bandwidth is available with the required service window size.

19. The computer system of claim 18, wherein the interconnect bus is a modified PCI-X bus and wherein the first command is issued on a C/BE# portion of the modified PCI-X bus.

20. The computer system of claim 18, wherein the bus arbiter is further adapted to recognize transactions from the isochronous bus controller to the first device and the second device to open a service window, and wherein the bus arbiter is further adapted recognize transactions from the isochronous bus controller to the first device and the second device to close a service window.

21. The computer system of claim 18, wherein the second device is coupled to the interconnect bus, the second device operating according to the interconnect protocol, the second device adapted to receive the first interconnect transaction, the second device generating the second interconnect transaction accepting first interconnect transaction if the required bandwidth is available with the required service window size.

22. A method of providing isochronous channels in a computer system, comprising the steps of:

(a) sending a request on an interconnect bus of the computer system to establish an isochronous channel with a second device from a first device, wherein sending the request comprises:

specifying a required bandwidth value; and
specifying a required service window size;

(b) determining whether sufficient bandwidth on the interconnect bus is available for the isochronous channel requested in step (a), wherein determining comprises:

determining an available bandwidth of the interconnect bus;
comparing the available bandwidth to the required bandwidth value; and if the available bandwidth is lower than the required bandwidth value, notifying the first device of the failure of the request;

(c) if step (b) determines sufficient bandwidth is available, sending the request on the interconnect bus to the second device;

(d) determining whether the second device has sufficient bandwidth for the isochronous channel requested by the first device in step (a), wherein step (d) comprises:

notifying the second device of the request;
determining an available second device bandwidth;
comparing the available second device bandwidth to the required bandwidth;

if the available second device bandwidth is less than the required bandwidth value, notifying the first device of the failure of the request;

(e) if step (d) determines that the second device has sufficient bandwidth for the isochronous channel requested by the first device, sending an acceptance of the request, wherein step(e) comprises:

determining whether a service window of the required service window size is available for the required bandwidth;

if no service window of the required service window size is available for the required bandwidth, notifying the first device of the failure of the request; and adjusting the required service window size based on available service window sizes; and accepting the isochronous channel request;

(f) allocating a portion of the bandwidth of the interconnect bus for the isochronous channel; and (g) instructing the first device to begin generating isochronous transactions with the second device.

23. The method of claim 22, the required service window size comprising:

a minimum service window size; and
a maximum service window size.

24. The method of claim 22, step (f) comprising the step of allocating an isochronous channel on the interconnect bus of the required bandwidth value and required service window size.

25. The method of claim 22, step (g) comprising the steps of:

notifying the first device to begin initiating isochronous transactions in the isochronous channel; and
notifying the first device to stop initiating isochronous transactions.

26. The method of claim 22, further comprising the steps of:

monitoring isochronous transactions in the isochronous channel;
repeating step (g) until the monitoring step determines a predetermined condition has occurred.

27. The method of claim 26, wherein the predetermined condition is the first device ceasing to initiate isochronous transactions.

28. The method of claim 22, further comprising the steps of providing an isochronous bus controller, the isochronous bus controller performing step (b), (c), and (f).

29. The method of claim 22, wherein the interconnect bus is a modified PCI-X bus.

30. A method of providing isochronous channels in a computer system, comprising the steps of:

(a) sending a request on an interconnect bus of the computer system to establish an isochronous channel with a second device from a first device;

(b) determining whether sufficient bandwidth on the interconnect bus is available for the isochronous channel requested in step (a);

(c) if step (b) determines sufficient bandwidth is available, sending the request on the interconnect bus to the second device;

(d) determining whether the second device has sufficient bandwidth for the isochronous channel requested by the first device in step (a);

(e) if step (d) determines that the second device has sufficient bandwidth for the isochronous channel requested by the first device, sending an acceptance of the request;

(f) allocating a portion of the bandwidth of the interconnect bus for the isochronous channel; and (g) instructing the first device to begin generating isochronous transactions with the second device;

(h) dividing the interconnect bus into a plurality of interconnect bus segments;

(i) providing a plurality of isochronous bus controllers, each interconnect bus segment controlled by an isochronous bus controller of the plurality of isochronous bus controllers;

(j) defining a path traversing the plurality of interconnect bus segments between the first device and the second device; and (k) repeating steps (b)–(c) by forwarding the request from the first device to each isochronous bus controller of the plurality of isochronous bus controllers on the path, wherein each isochronous bus controller of the plurality of isochronous bus controllers on the path performs step (f).

31. The method of claim 30, step (a) comprising the steps of:
specifying a required bandwidth value; and
specifying a required service window size.

32. The method of claim 31, the required service window size comprising:
a minimum service window size; and
a maximum service window size.

33. The method of claim 31, step (b) comprising the steps of:
determining an available bandwidth of the interconnect bus;
comparing the available bandwidth to the required bandwidth value; and
if the available bandwidth is lower than the required bandwidth value, notifying the first device of the failure of the request.

34. The method of claim 31, step (d) comprising the steps of:
notifying the second device of the request;
determining an available second device bandwidth;
comparing the available second device bandwidth to the required bandwidth;
if the available second device bandwidth is less than the required bandwidth value, notifying the first device of the failure of the request.

35. The method of claim 31, step (f) comprising the step of allocating an isochronous channel on the interconnect bus of the required bandwidth value and required service window size.

36. The method of claim 30, step (g) comprising the steps of:
notifying the first device to begin initiating isochronous transactions in the isochronous channel; and
notifying the first device to stop initiating isochronous transactions.

37. The method of claim 30, further comprising the steps of:
monitoring isochronous transactions in the isochronous channel;
repeating step (g) until the monitoring step determines a predetermined condition has occurred.

38. The method of claim 37, wherein the predetermined condition is the first device ceasing to initiate isochronous transactions.

39. The method of claim 30, further comprising the steps of providing an isochronous bus controller, the isochronous bus controller performing step (b), (c), and (f).

40. The method of claim 30, wherein the interconnect bus is a modified PCI-X bus.

41. A method of requesting isochronous communication between a first device and a second device, comprising the steps of:
sending a first request transaction on an interconnect bus from the first device to an isochronous bus controller, the first request transaction comprising:
a request to be allocated bandwidth for an isochronous channel;
an identification data for the second device;
a required bandwidth;
a minimum service window size; and
a maximum service window size;
sending a second request transaction on the interconnect bus from the isochronous bus controller to the second device, the second request transaction comprising:
a request to begin an isochronous channel;
an identification data for the first device;
a required bandwidth;
a minimum service window size; and
a maximum service window size;
sending a first response transaction on the interconnect bus from the second device to the isochronous bus controller, the first response transaction comprising:
an indicator of acceptance or rejection of the request; and
a minimum service window size; and
a maximum service window size;
sending a second response transaction on the interconnect bus from the isochronous bus controller to the first device, the second response transaction comprising:
notification to begin sending isochronous transactions to the second device; and
sending a transaction to the first device from the isochronous bus controller to cease generating isochronous transactions.

42. The method of claim 41, the request to be allocated bandwidth comprising a command signal.

43. The method of claim 42, wherein the interconnect bus is a modified PCI-X bus and wherein the command signal is a signal on a C/BE# portion of the modified PCI-X bus.

44. The method of claim 42, the request to be allocated bandwidth further comprising an indicator that the transaction is a message type command.

45. The method of claim 44, the request to be allocated bandwidth further comprising a message type indicator, indicating that the transaction is a request to open an isochronous channel.

46. The method of claim 42,
the request to be allocated bandwidth further comprising:
p2 an address phase, the address phase comprising: p3 a isochronous bus controller bus identifier; and p3 an isochronous bus controller device identifier,
further comprising the step of routing the first request transaction across the interconnect bus by using the isochronous bus controller bus identifier and the isochronous bus controller device identifier.

47. The method of claim 41, wherein the second request transaction is generated by forwarding the first request transaction.

48. The method of claim 41, the transaction to cease generating isochronous transactions comprising a command signal indicating an isochronous window termination.

49. The method of claim 48, wherein the interconnect bus is a modified PCI-X bus, and wherein the command signal is a special cycle command signal on a C/BE# portion of the modified PCI-X bus.

50. The method of claim 48, the transaction to cease generating isochronous transactions further comprising an indicator that the isochronous channel has terminated.

51. A method of requesting isochronous communication between a first device and a second device, comprising the steps of:
sending a first request transaction on an interconnect bus from the first device to an isochronous bus controller, the first request transaction comprising:
a request to be allocated bandwidth for an isochronous channel;
an identification data for the second device;
a required bandwidth;
a minimum service window size; and
a maximum service window size;
sending a second request transaction on the interconnect bus from the isochronous bus controller to the second device, the second request transaction comprising:
a request to begin an isochronous channel;
an identification data for the first device;
a required bandwidth;
a minimum service window size; and
a maximum service window size;
sending a first response transaction on the interconnect bus from the second device to the isochronous bus controller, the first response transaction comprising:
an indicator of acceptance or rejection of the request; and
a minimum service window size; and
a maximum service window size; and
sending a second response transaction on the interconnect bus from the isochronous bus controller to the first device, the second response transaction comprising:
notification to begin sending isochronous transactions to the second device, wherein the isochronous transactions comprise an attribute value, the attribute value transmitted during an attribute phase of the interconnect bus, the attribute value identifying the transaction as isochronous.

52. The method of claim 51, the request to be allocated bandwidth comprising a command signal.

53. The method of claim 52, wherein the interconnect bus is a modified PCI-X bus, and wherein the command signal is a signal on a C/BE# portion of the modified PCI-X bus.

54. The method of claim 52, the request to be allocated bandwidth further comprising an indicator that the transaction is a message type command.

55. The method of claim 54, the request to be allocated bandwidth further comprising a message type indicator, indicating that the transaction is a request to open an isochronous channel.

56. The method of claim 52, wherein the request to be allocated bandwidth further comprising:
an address phase, the address phase comprising:
a isochronous bus controller bus identifier; and
an isochronous bus controller device identifier;
further comprising the step of routing the first request transaction across the interconnect bus by using the isochronous bus controller bus identifier and the isochronous bus controller device identifier.

57. The method of claim 51, wherein the second request transaction is generated by forwarding the first request transaction.

58. A method of requesting isochronous communication between a first device and a second device, comprising the steps of:
sending a first request transaction on an interconnect bus from the first device to an isochronous bus controller, the first request transaction comprising:
a request to be allocated bandwidth for an isochronous channel;
an identification data for the second device;
a required bandwidth;
a minimum service window size; and
a maximum service window size;
wherein the interconnect bus comprises:
a plurality of bus segments, each of the plurality of bus segments having an available segment bandwidth; the isochronous bus controller having a plurality of segment isochronous bus controllers, the available segment bandwidth of each of the plurality of bus segments controlled by one of the plurality of segment isochronous bus controllers; and
wherein the step of sending a first request transaction on the interconnect bus from the first device to the isochronous bus controller further comprises the steps of:
forwarding the first request transaction to each of the distributed isochronous bus controllers along a path from the first device to the second device; and
adjusting the minimum service window size and the maximum service window size for each bus segment along the path;
sending a second request transaction on the interconnect bus from the isochronous bus controller to the second device, the second request transaction comprising:
a request to begin an isochronous channel;
an identification data for the first device;
a required bandwidth;
a minimum service window size; and
a maximum service window size;
sending a first response transaction on the interconnect bus from the second device to the isochronous bus controller, the first response transaction comprising:
an indicator of acceptance or rejection of the request; and
a minimum service window size; and
a maximum service window size; and
the step of sending the first response transaction on the interconnect bus from the second device to the isochronous bus controller further comprises forwarding the first response transaction to each of the distributed isochronous bus controllers along the path; and sending a second response transaction on the interconnect bus from the isochronous bus controller to the first device, the second response transaction comprising: notification to begin sending isochronous transactions to the second device.

59. The method of claim 58, the request to be allocated bandwidth comprising a command signal.

60. The method of claim 59, wherein the interconnect bus is a modified PCI-X bus, and wherein the command signal is a signal on a C/BE# portion of the modified PCI-X bus.

61. The method of claim 59, the request to be allocated bandwidth further comprising an indicator that the transaction is a message type command.

62. The method of claim 61, the request to be allocated bandwidth further comprising a message type indicator, indicating that the transaction is a request to open an isochronous channel.

63. The method of claim 59,
the request to be allocated bandwidth further comprising:
an address phase, the address phase comprising:
a isochronous bus controller bus identifier; and
an isochronous bus controller device identifier; and
further comprising the step of routing the first request transaction across the interconnect bus by using the isochronous bus controller bus identifier and the isochronous bus controller device identifier.

64. The method of claim 58, wherein the second request transaction is generated by forwarding the first request transaction.

65. The method of claim 58, wherein some of the plurality of distributed isochronous bus controllers are interconnect bridges.

66. A computer system comprising:
a central processing unit connected to a host bus;
a random access memory connected to a system memory bus;
an interconnect bus operating according to an interconnect protocol;
a core logic chip coupled as a first interface bridge between the host bus and the system memory bus, as a second interface bridge between the host bus and the interconnect bus, and as a third interface bridge between the system memory bus and the interconnect bus;
a first device coupled to the interconnect bus, the first device operating according to the interconnect protocol, the first device adapted to provide a plurality of phases in a first interconnect transaction, the first device adapted to issue a first command in a first phase according to the interconnect protocol and a data corresponding to the first command in a subsequent phase, the first command requesting an isochronous channel with a second device identified in the data, the data comprising:
a second device identification;
a required bandwidth; and
a required service window size.
an isochronous bus controller, the isochronous bus controller adapted to allocate and manage bandwidth of the interconnect bus for isochronous channels, wherein the first interconnect transaction is sent to the isochronous bus-controller, wherein the isochronous bus controller forwards the first interconnect transaction to the second device if the required bandwidth is available with the required service window size, the isochronous bus controller comprising:
a plurality of distributed isochronous bus controllers, each of the plurality of bus segments controlled by one of the plurality of distributed isochronous bus controllers, the first interconnect transaction forwarded to each of the plurality of distributed isochronous bus controllers along a path from the first device to the second device, responsive to an available bandwidth and available service window for each of the plurality of bus segments along the path.

67. The computer system of claim 66, wherein the interconnect bus is a modified PCI-X bus and wherein the first command is issued on a C/BE# portion of the modified PCI-X bus.

68. The computer system of claim 66, wherein some of the plurality of distributed isochronous bus controllers are interconnect bridges.

69. The computer system of claim 66, wherein the second device is coupled to the interconnect bus, the second device operating according to the interconnect protocol, the second device adapted to receive the first interconnect transaction, the second device generating the second interconnect transaction accepting first interconnect transaction if the required bandwidth is available with the required service window size.

* * * * *

UNITED STATES PATENT AND TRADEMARK OFFICE
CERTIFICATE OF CORRECTION

PATENT NO.         : 6,871,248 B2
APPLICATION NO. : 09/967606
DATED                 : March 22, 2005
INVENTOR(S)        : Dwight D. Riley It is certified that error appears in the above-identified patent and that said Letters Patent is hereby corrected as shown below:

Claim 46, Column 17, line 3, delete "p2"

Claim 46, Column 17, line 3, delete "p3"

Claim 46, Column 17, line 4, delete "p3"

Signed and Sealed this

Eighth Day of September, 2009

David J. Kappos
*Director of the United States Patent and Trademark Office*